(12) United States Patent
Liang et al.

(10) Patent No.: US 9,106,443 B2
(45) Date of Patent: Aug. 11, 2015

(54) FORWARDING TABLE OPTIMIZATION WITH FLOW DATA

(71) Applicant: CISCO TECHNOLOGY, INC., San Jose, CA (US)

(72) Inventors: Yaonan Liang, San Carlos, CA (US); Chengelpet V. Ramesh, San Jose, CA (US); Ganesh P. Murthy, San Diego, CA (US); Ming Zhang, San Jose, CA (US); Rajesh B. Nataraja, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 13/661,624

(22) Filed: Oct. 26, 2012

(65) Prior Publication Data

US 2014/0119379 A1 May 1, 2014

(51) Int. Cl.
*H04L 12/46* (2006.01)
*H04L 12/743* (2013.01)
*H04L 12/751* (2013.01)
*H04L 12/741* (2013.01)

(52) U.S. Cl.
CPC ............ *H04L 12/4625* (2013.01); *H04L 45/02* (2013.01); *H04L 45/54* (2013.01); *H04L 45/7457* (2013.01)

(58) Field of Classification Search
CPC ..... H04L 12/4625; H04L 45/02; H04L 45/54; H04L 45/7475
USPC ................. 370/230, 392, 469, 252, 389, 465; 709/226, 224, 219, 238
See application file for complete search history.

(56) References Cited

U.S. PATENT DOCUMENTS

| 6,243,667 | B1 | 6/2001 | Kerr et al. |
| 6,308,148 | B1 | 10/2001 | Bruins et al. |
| 7,058,070 | B2 * | 6/2006 | Tran et al. ..................... 370/412 |
| 7,061,858 | B1 | 6/2006 | Di Benedetto et al. |
| 2011/0317559 | A1 | 12/2011 | Kern et al. |

* cited by examiner

*Primary Examiner* — Chandrahas Patel
(74) *Attorney, Agent, or Firm* — Cindy Kaplan

(57) ABSTRACT

In one embodiment, a method includes receiving from a server, flow data for a plurality of flows at a network device, the flow data comprising for each flow, a destination address and a time indicating when a last packet was processed for the flow at the server, updating a flow table at the network device, identifying one of the flows in the flow table as an inactive flow, and removing a route for the inactive flow from a forwarding information base at the network device. An apparatus and logic are also disclosed herein.

20 Claims, 5 Drawing Sheets

FORWARDING TABLE OPTIMIZATION WITH FLOW DATA

TECHNICAL FIELD

The present disclosure relates generally to communication networks, and more particularly, to forwarding table optimization.

BACKGROUND

In a data center environment, edges devices are used to route communications between servers that may host hundreds of virtual machines. The edge devices often have small hardware forwarding tables and the number of routes that each switch needs to maintain may exceed the capacity of the switch's hardware forwarding table. The selection of routes to program in the hardware forwarding table and utilization of the table is important to performance and scalability in data center networks and other networks wherein the hardware forwarding table is limited in size.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving from a server, flow data for a plurality of flows at a network device, the flow data comprising for each of the flows, a destination address and a time indicating when a last packet was processed for the flow at the server, updating a flow table at the network device, identifying one of the flows in the flow table as an inactive flow, and removing a route for the inactive flow from a forwarding information base at the network device.

In another embodiment, an apparatus generally comprises a forwarding information base for storing routes for a plurality of flows and a flow table for storing flow data for the flows, the flow data comprising for each of the flows, a destination address and a time indicating when a last packet was processed for the flow at a server. The apparatus further comprises a processor for updating the flow table based on the flow data received from the server, identifying one of the flows in the flow table as an inactive flow, and removing a route for the inactive flow from the forwarding information base.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Edge devices such as Top-of-Rack (ToR) switches typically have small hardware forwarding tables. The switches may be connected to servers that host hundreds of virtual machines (VMs), with each virtual machine communicating with any number of remote hosts. The number of routes that each switch needs to maintain is typically much larger than the size of the hardware forwarding table at the switch. Also, frequent virtual machine migration results in new routes that need to be programmed in the hardware forwarding table. If the hardware forwarding table is already full, the new routes may not be programmed in the table. If a route cannot be programmed in the hardware forwarding table, packets are either switched by software or dropped, which impacts system performance.

The embodiments described herein leverage flow data available in the network to identify active and inactive routes. The flow information can be used to quickly remove inactive routes from the hardware forwarding table when space is limited. The embodiments thereby help to scale networks and provide improved performance.

Figure 1:
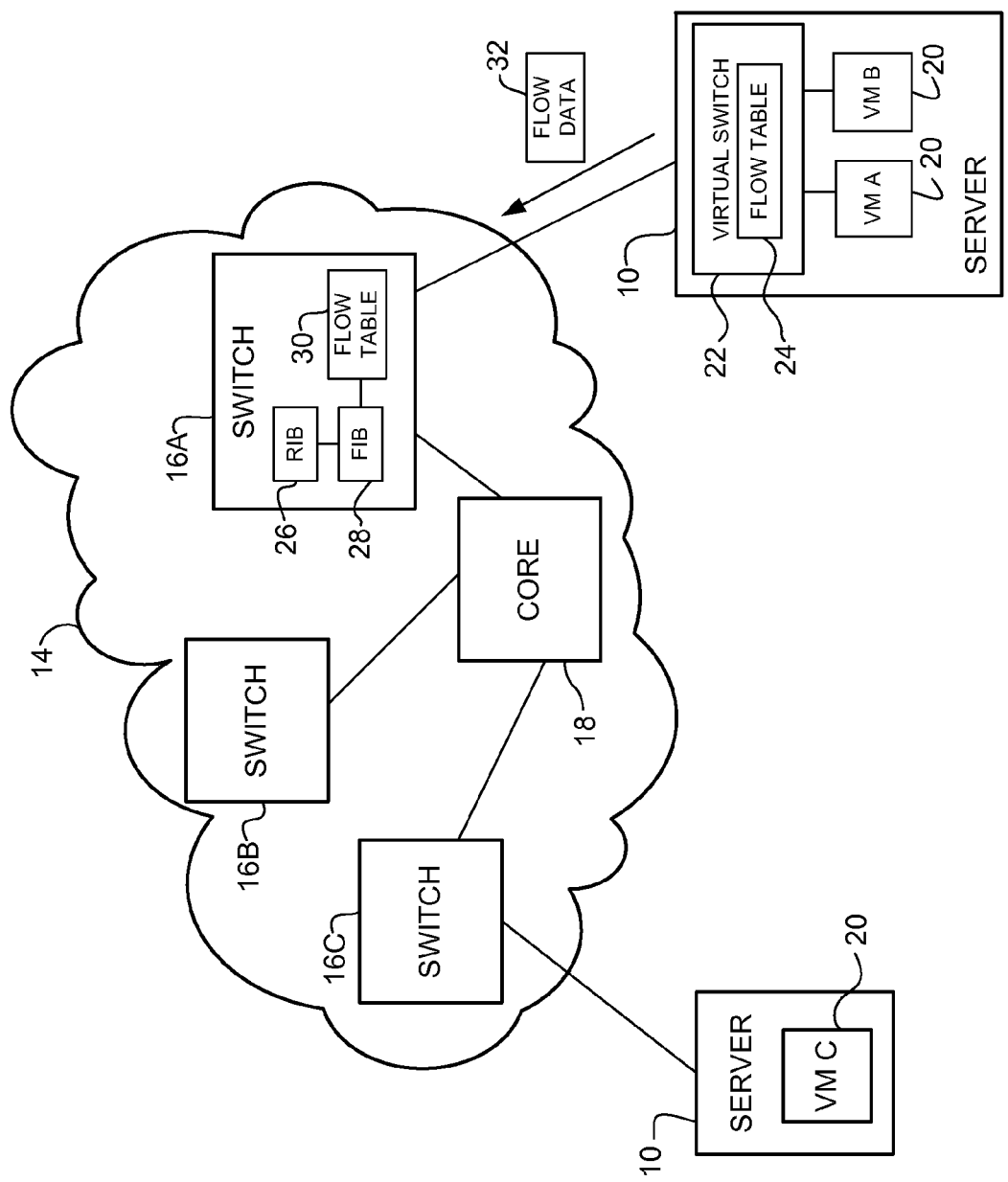
FIG. 1 illustrates an example of a network in which embodiments described herein may be implemented.

Referring now to the drawings, and first to FIG. 1, an example of a network in which embodiments described herein may be implemented is shown. For simplification, only a small number of nodes are shown. In the example shown in FIG. 1, two servers (hosts, endpoints, physical machines) 10 are in communication over a network 14. Each of the servers 10 may be configured to host one or more virtual machines (VMs) 20. The network 14 contains a plurality of network devices including edge devices 16A, 16B, 16C in communication via core device 18. The network 14 may include any number of edge devices in communication with any number of intermediate or core nodes (e.g., routers, switches, or other network devices), which facilitate passage of data within the network. The network 14 may be configured for use as a data center or any other type of network.

In one embodiment, the network 14 employs a conversational forwarding model. In a conversational forwarding model, the edge device programs only conversational directly connected host routes. A conversational route is a route that is needed to forward packets that the switch has encountered within a defined time period. The terms 'route' or 'flow' as used herein may refer to a conversation in a conversational forwarding model or a route or flow in a traditional forwarding model.

The edge devices 16A, 16B, 16C may be in communication with any number of servers 10, which may comprise any number of virtual machines 20. In the example shown in FIG. 1, edge device 16A is in communication with a server hosting virtual machines VM A and VM B, and edge device 16C is in communication with a server hosting virtual machine VM C.

The edge devices 16A, 16B, 16C may be layer 3 (L3) switching devices or other network devices (e.g., router, switch, router/switch) configured to perform forwarding functions. In one embodiment, the edge devices 16A, 16B, 16C are Top-of-Rack (ToR) switches. The switches may be, for example, a NEXUS 3000 or NEXUS 5000 series switch available from Cisco Systems, Inc. of San Jose, Calif. It is to be understood that these are only examples of network devices that may be used to implement the embodiments described herein.

Each switch 16A, 16B, 16C maintains a routing information base (RIB) 26 (also referred to as a routing table) that is constructed and updated by routing protocols, and a forwarding information base (FIB) 28 (also referred to as a forwarding table). For simplification, the RIB 26 and FIB 28 are only shown at switch 16A. The other switches 16B and 16C may have components similar to those shown for switch 16A. The FIB 28 is smaller than the RIB 26 and optimized for fast lookup of destination addresses. The RIB 26 is typically implemented in software, while the FIB 28 is implemented with fast hardware lookup mechanisms, such as ternary content-addressable memory (TCAM). If a route in RIB 26 cannot be programmed in in the FIB 28, packets are either switched by software (e.g., FIB table implemented in software) or dropped.

The server 10 may be, for example, a blade server, rack server, or any other type of network device operable to host virtual machines 20. The server 10 may include a virtual switch (e.g., Virtual Ethernet Module (VEM) of a NEXUS 1000 series switch, available from Cisco Systems, Inc.). The virtual switch 22 switches traffic between the virtual machines 20 and physical network interfaces. The virtual machines 20 share hardware resources without interfering with each other, thus enabling multiple operating systems and applications to execute at the same time on a single computer. The virtual machines 20 may be used, for example, in a virtual infrastructure to dynamically map physical resources to business needs. A virtual machine monitor such as hypervisor (not shown) dynamically allocates hardware resources to the virtual machines 20.

The virtual machines 20 may reside in one or more virtual networks or subnets. The virtual machines 20 may be moved (referred to, for example, as virtual machine mobility, vMotion, live migration, or virtual machine migration) between servers 10, across layer 2 or layer 3 boundaries, based on traffic patterns, hardware resources, or other criteria.

In one example, VM A and VM C are located in different subnets. In order to forward packets from VM A to VM C, the route to VM C should be programmed in the forwarding table of switch 16A and preferably in its hardware FIB 28. However, if the hardware FIB 28 is already full, the route may not be programmed. As described in detail below, the embodiments use flow data 32 received from the server 10 to identify inactive flows and remove corresponding routes from the hardware FIB 28 when it is full (e.g., reaches a threshold capacity level) so that new routes can be programmed in the FIB. The switch may receive flow data from any number of servers.

A flow is defined as a unidirectional sequence of packets with common properties that pass through a network device. For example, packets with the same five tuples may belong to the same flow. The five tuple may include, for example, destination IP address, source IP address, destination port, source port, and protocol. Flow statistics may include, for example, packet count, byte count, flow creation time, and flow last-packet-hit time.

One or more of the servers 10 are configured to support flow data collecting and exporting. In the example shown in FIG. 1, the flow data is collected at a flow table 24 at the server 10 and exported to switch 16A. In one embodiment, the flow table 24 is maintained by the virtual switch 22. The flow data may be collected and exported using a format such as IPFIX (Internet Protocol Flow Information Export), NDE (NetFlow Data Export), or any other format. Flow data 32 from the flow table 24 is transmitted to the switch 16A for use in optimizing the utilization of hardware forwarding table 28 at the switch. In one example, the flow data 32 is transmitted from a directly connected host (e.g., server 10) to the edge device (e.g., switch 16A). The flow data 32 is stored in flow table 30 (also referred to as a conversational table) at switch 16A. As described in detail below, the flow data stored in table 30 is used to quickly remove inactive routes from the FIB 28 when space is limited.

The edge device 16A may also have another flow table (not shown) used to collect flow data for traffic at the edge device. Thus, in one implementation, the edge device may have two flow tables; the flow table 30 (conversational table), which receives flow data 32 collected at the server 10 and another flow table for storing flow data collected at the edge device 16A. Since the server 10 only reports active flows (conversations) to the edge device 16A, the number of conversations tracked at flow table 30 can be reduced as compared to a flow table collecting data for all traffic at the switch.

It is to be understood that the network shown in FIG. 1 and described herein is only an example and that the embodiments may be implemented in networks having different network topologies and network devices, without departing from the scope of the embodiments. For example, the network may include any number or type of edge devices, hosts, or virtual machines.

Figure 2:
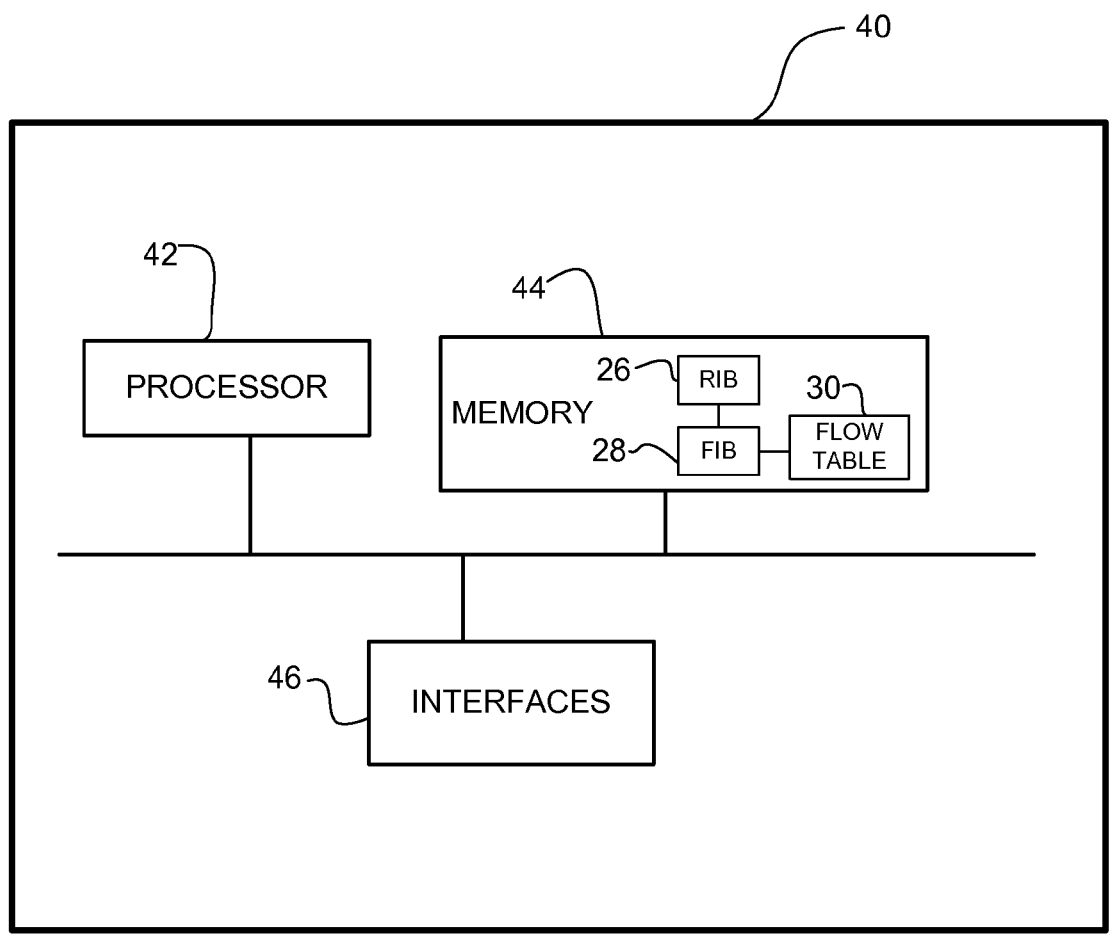
FIG. 2 depicts an example of a network device useful in implementing embodiments described herein.

An example of a network device (e.g., ToR switch) 40 that may be used to implement embodiments described herein is shown in FIG. 2. In one embodiment, network device 40 is a programmable machine that may be implemented in hardware, software, or any combination thereof. The device 40 includes one or more processor 42, memory 44, and network interfaces 46.

Memory 44 may be a volatile memory or non-volatile storage, which stores various applications, modules, and data for execution and use by the processor 42. As shown in FIG. 2, memory includes RIB 26, FIB 28, and flow table 30. In one embodiment, the RIB 26 and flow table 30 are generated in software and used to program the FIB 28 in hardware. The FIB 28 may be implemented in content-addressable memory (e.g., TCAM) or other data structure. Memory 44 may comprise any number and type of storage components.

Logic may be encoded in one or more tangible computer readable media for execution by the processor 42. For example, the processor 42 may execute codes stored in a computer readable medium such as memory 44. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 46 may comprise any number of interfaces (linecards, ports) for receiving data or transmitting data to other devices. The interface 46 may include, for example, an Ethernet interface for connection to a computer or network.

It is to be understood that the network device 40 shown in FIG. 2 and described above is only an example and that network devices having different components and configurations may be used without departing from the scope of the embodiments.

Figure 3:
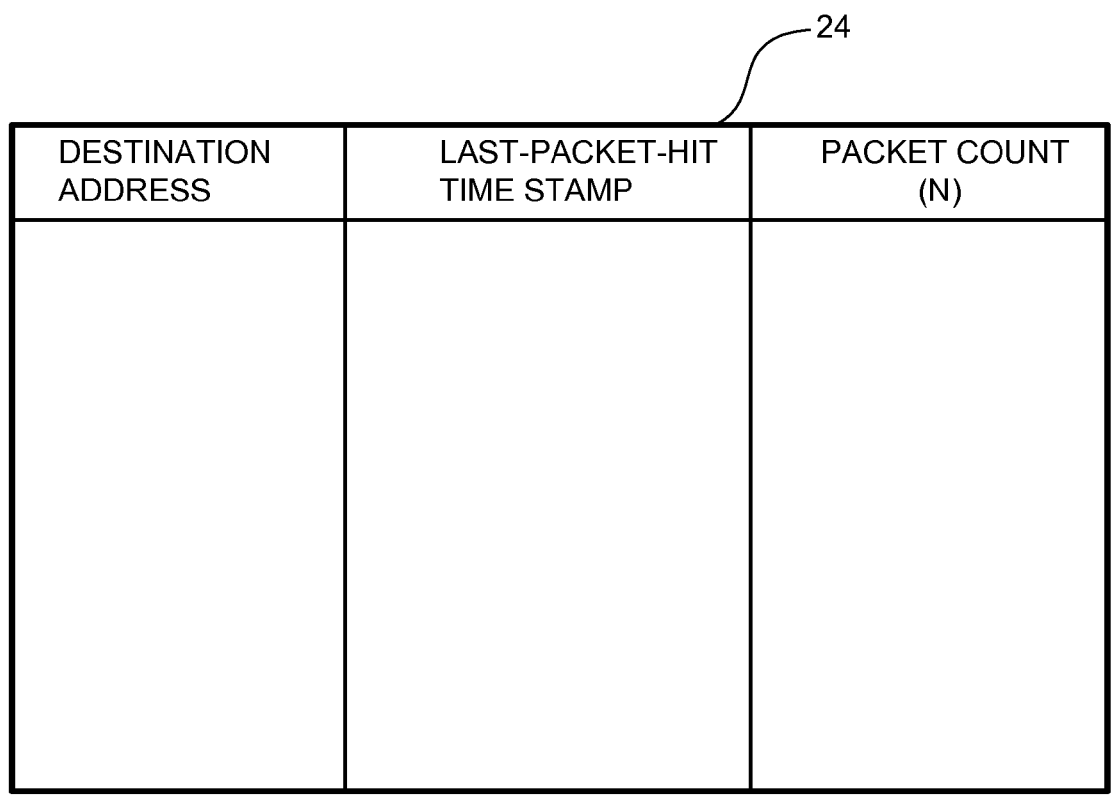
FIG. 3 illustrates an example of a flow table at a server in the network of FIG. 1.

FIG. 3 illustrates an example of flow table 24 for use in collecting flow data at server 10. In one embodiment, the table 24 includes a destination address (DA), Last-Packet-Hit Time Stamp (LTS), and packet count (N) for each flow entry. The destination address may comprise, for example, an IP address for the virtual machine 20 or host 10, or another identifier used to identify the flow or receiver. LTS indicates a time when a last packet was processed (e.g., packet received or transmitted, flow entry updated, lookup performed), for a corresponding flow at the server 10.

The server 10 scans the flow table 24 for flows that are active within a time period (TP) and then exports the flow data for these flows to the switch 16A at a time interval (TI). Parameters TP and TI may be set to a default value or adjusted based on system performance. In one example, the server 10 exports data for flows that have an LTS within the last five minutes. In order to reduce the amount of flow data exported to the switch, the server 10 may only export flow data for flows with a high packet count as compared to all flows at the server. For example, the server 10 may list flows in the flow table 24 according to packet count (N) (e.g., flow with highest packet count at top), select a top number of flows or percentage of flows for which to export flow data, and export flow data only for those selected entries. A minimum packet count may also be used in selecting data to export to the switch. The table 24 may also be constructed without a packet count, in which case the flow data for all flows active within a specified time period (TP) is transmitted to the switch.

Figure 4:
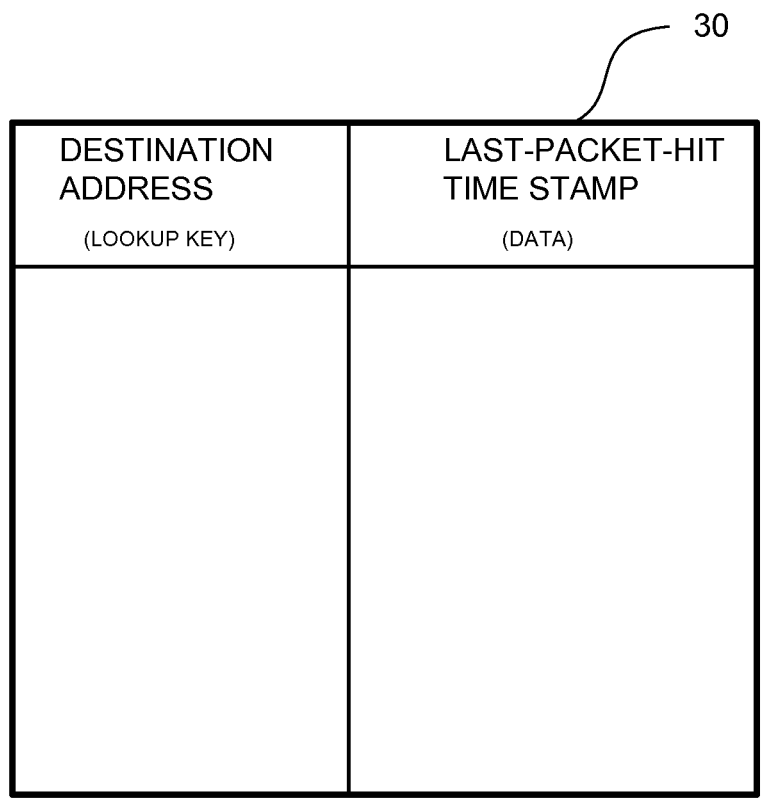
FIG. 4 illustrates an example of a flow table at a switch in the network of FIG. 1.

FIG. 4 illustrates an example of flow table 30 at switch 16A. In one embodiment, the flow table 30 is implemented as a lookup table, wherein the key is the destination address (DA) and the data is Last-Packet-Hit Time Stamp (LTS). Upon receiving flow data 32 from server 10, the switch 16A looks up the destination address in its flow table 30. If an entry is found, the switch updates the LTS in the flow table for the found entry. If the lookup does not find an entry, the switch uses the DA and LTS of the received flow data to create a new entry in the table 30. The flow table 30 may be implemented as an extension to the FIB table 28 or as a separate table. The flow data may be processed at a lower priority or offloaded to another server if CPU (central processing unit) utilization is a concern on the switch 16A. As described below, data from the flow table 30 is used to identify and remove inactive routes from the hardware FIB 28.

It is to be understood that the tables shown in FIGS. 3 and 4 are only examples and that the data may be stored in data structures having different formats or content, without departing from the scope of the embodiments.

Figure 5:
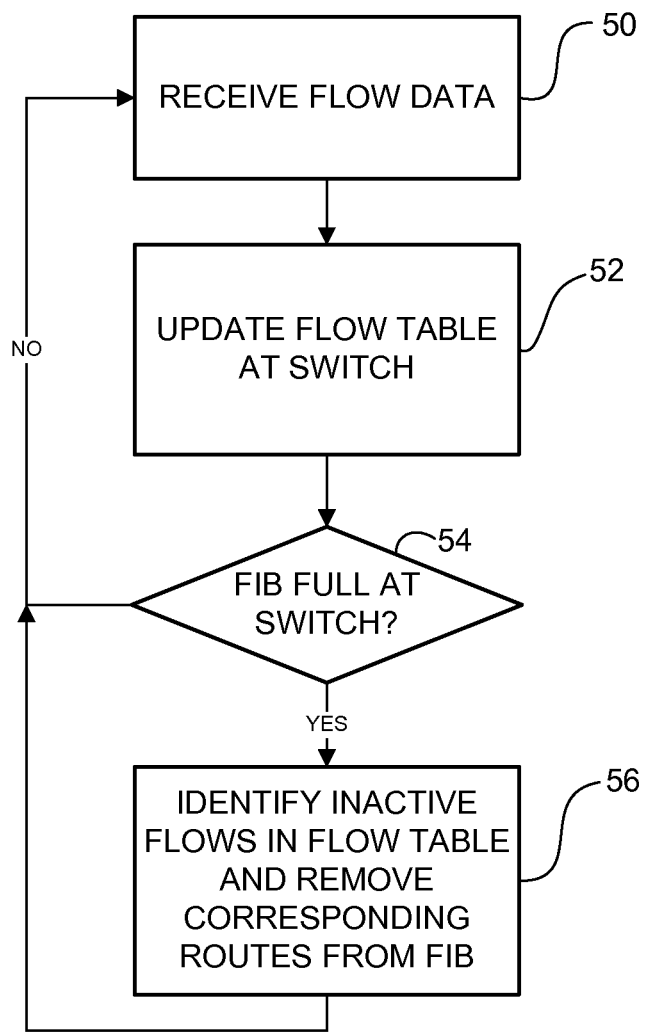
FIG. 5 is a flowchart illustrating an overview of a process for forwarding table optimization, in accordance with one embodiment.

FIG. 5 is a flowchart illustrating an overview of a process for forwarding table optimization, in accordance with one embodiment. At step 50, the network device (e.g., switch 16A in FIG. 1) receives flow data 32 from server 10. As previously described, the flow data includes a destination address and a time indicating when a last packet was processed for the flow at the server (LTS). The switch 16A uses the flow data 32 to update its flow table 30 (e.g., update entry or create new entry) (step 52). When contention level of the hardware FIB 28 on the switch 16A exceeds a threshold (e.g., 90%), the switch searches the flow table 30 by LTS to identify inactive flows (conversations) and remove corresponding routes (e.g., destination address/prefixes) from its hardware FIB so that new routes for active conversations can be programmed in the hardware FIB (steps 54 and 56). The inactive flow may be any flow with an LTS older than a specified time, which may be calculated based on the current time and a defined time interval.

If the switch 16A does not receive a flow data update from the server 10, it is possible that an active route may be removed from the FIB 28. However, as long as the flow is active, the corresponding route will be programmed again into the FIB 28.

It is to be understood that the process illustrated in FIG. 5 and described above is only an example and that steps may be modified, added, or combined, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving from a server, exported flow data for a plurality of flows at a network device, the exported flow data comprising for each of said flows, a destination address and a time indicating when a last packet was processed for said flow at the server;
   updating a flow table at the network device;
   identifying one of said flows in the flow table as an inactive flow; and
   removing a route for said inactive flow from a forwarding information base at the network device;
   wherein the time when a last packet was processed comprises the time a packet for said flow was received or transmitted at the server.

2. The method of claim 1 wherein the network device comprises a switch operating at an edge of a data center network.

3. The method of claim 1 wherein the server is a directly connected host comprising a plurality of virtual machines.

4. The method of claim 1 wherein the forwarding information base is implemented in hardware and further comprising determining that capacity at the forwarding information base has reached a threshold level before removing the route.

5. The method of claim 1 wherein the flow table comprises a lookup table comprising said destination address as a key, and the time indicating when the last packet was processed for said flow.

6. The method of claim 1 wherein the flow data received from the server comprises flow data only for flows with a high packet count as compared to all flows at the server.

7. The method of claim 1 wherein the route is removed from the forwarding information base only if a contention level at the forwarding information base has reached a threshold level.

8. The method of claim 1 further comprising receiving the flow data at periodic intervals.

9. The method of claim 1 wherein the flow data comprises data for flows active within a specified time period.

10. The method of claim 1 further comprising determining that a capacity level in a forwarding information base exceeds a predefined level.

11. An apparatus comprising:
    a forwarding information base for storing routes for a plurality of flows;
    a flow table for storing flow data for said flows, the flow data comprising for each of said flows, a destination address and a time indicating when a last packet was processed for said flow at a server; and
    a processor for updating the flow table based on the flow data received from the server, identifying one of said flows in the flow table as an inactive flow, and removing a route for said inactive flow from the forwarding information base;

wherein the time when a last packet was processed comprises the time a packet for said flow was received or transmitted at the server.

12. The apparatus of claim 11 wherein the forwarding information base is stored in content-addressable memory.

13. The apparatus of claim 11 wherein the flow table comprises a lookup table comprising said destination address as a key.

14. The apparatus of claim 11 wherein the flow data received from the server comprises flow data only for flows with a high packet count as compared to all flows at the server.

15. The apparatus of claim 11 wherein the route is removed from the forwarding information base only if a contention level at the forwarding information base has reached a threshold level.

16. The apparatus of claim 11 wherein the flow data received from the server comprises flow data for flows active within a specified time period.

17. The apparatus of claim 11 wherein the apparatus comprises a switch configured for operation at an edge of a data center network.

18. An apparatus comprising:
a processor and logic encoded on one or more non-transitory computer readable media for execution and when executed by the processor operable to:
update a flow table upon receiving flow data for a plurality of flows from a server, the flow data comprising for each of said flows, a destination address and a time indicating when a last packet was processed for said flow at the server;
determine that a contention level at a forwarding information base has reached a threshold level;
identify one of said flows in the flow table as an inactive flow; and
remove a route for said inactive flow from the forwarding information base.

19. The apparatus claim 18 wherein the flow data received from the server comprises flow data for flows active within a specified time period.

20. The apparatus of claim 18 wherein the flow data received from the server comprises flow data only for flows with a high packet count as compared to all flows at the server.

* * * * *